United States Patent [19]
Baumann

[11] 3,885,771
[45] May 27, 1975

[54] ECCENTRIC ROTARY PLUG VALVE WITH QUICK REMOVAL TRIM INSERT

[76] Inventor: Hans D. Baumann, 29 Villa Dr., Foxboro, Mass. 02035

[22] Filed: Aug. 26, 1974

[21] Appl. No.: 500,306

Related U.S. Application Data

[63] Continuation-in-part of Ser. No. 456,757, April 1, 1974.

[52] U.S. Cl. ............... 251/298; 251/280; 251/315; 251/360
[51] Int. Cl. ............................................. F16k 1/20
[58] Field of Search ............ 251/309, 305, 308, 298, 251/160, 188, 179, 192, 228, 56, 58, 87, 84, 85, 235, 231, 88, 315, 314, 316, 279, 58, 360, 366, 359; 137/454.2, 299, 360, 315, 329.05, 229.01, 454.6

[56] References Cited
UNITED STATES PATENTS

| | | | |
|---|---|---|---|
| 482,534 | 9/1892 | Thurston | 251/279 X |
| 1,233,856 | 7/1917 | Elder | 137/614.19 X |
| 3,494,589 | 2/1970 | Mumma | 251/298 |
| 3,510,101 | 5/1970 | Burtis | 251/280 X |
| 3,575,376 | 4/1971 | Arvidson, Jr. | 251/160 X |
| 3,675,894 | 7/1972 | Friedell | 251/308 X |

*Primary Examiner*—Martin P. Schwadron
*Assistant Examiner*—Robert J. Miller

[57] ABSTRACT

A rotary type throttling valve with tubular valve housing and sliding valve trim insert consisting of an eccentric rotary plug cooperating with a seatring having an adjustable orifice center position in respect to the center of the plug, both supported and contained by and within a yoke member and having means to tiltably engage said rotary eccentric plug in relationship to the seatring.

5 Claims, 3 Drawing Figures

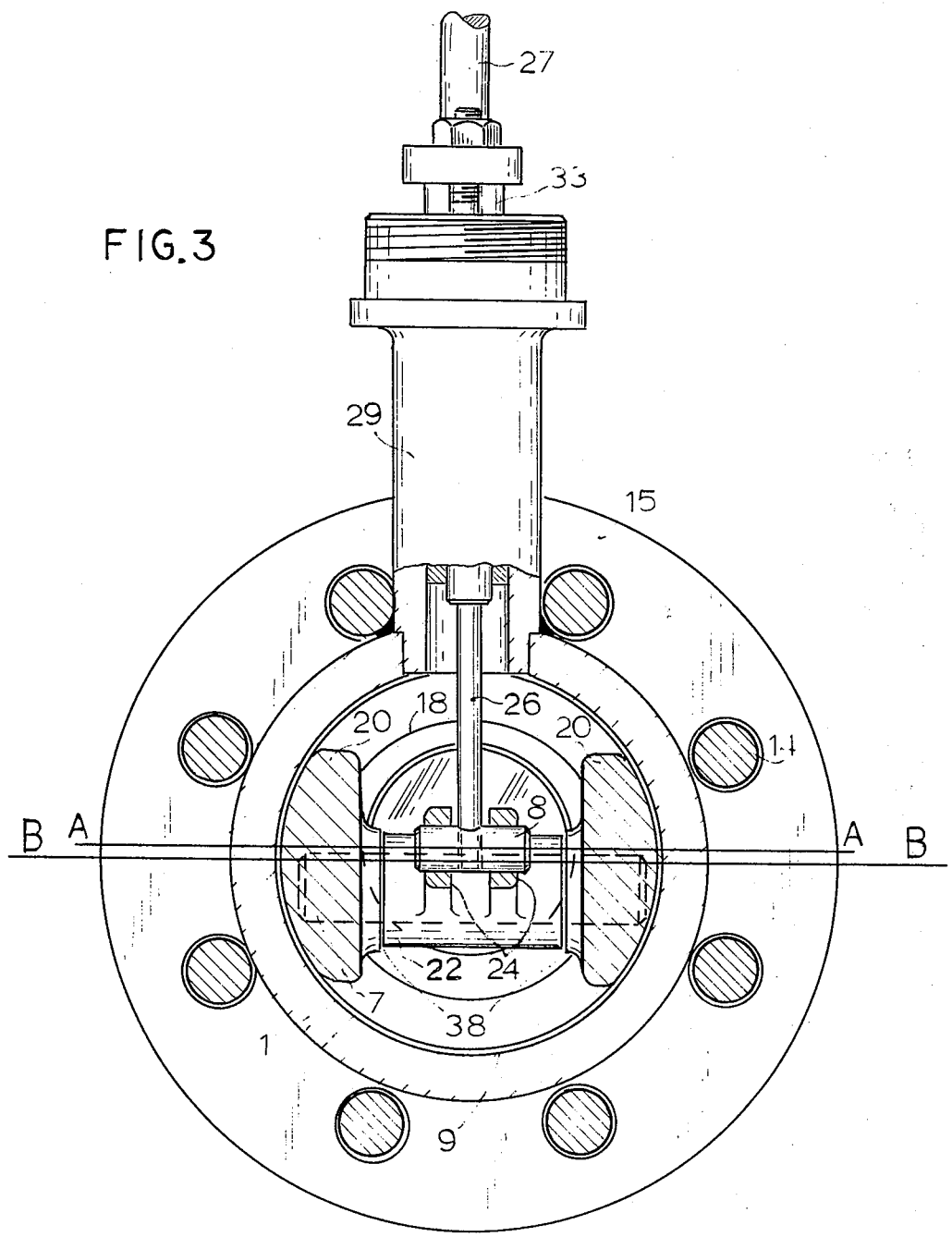

3,885,771

ECCENTRIC ROTARY PLUG VALVE WITH QUICK REMOVAL TRIM INSERT

This application is a continuation-in-part of my co-pending U.S. Pat. application Ser. No. 456757, filed Apr. 1, 1974.

BACKGROUND OF THE INVENTION

The field of art of my invention relates to that of valves for controlling fluid flow subject to automatic regulation by actuator means following a command signal of a controlling instrument or computor. Recently, a number of rotary valve designs have evolved in the quest for better performance, higher pressure drop capability, more flow capacity, and lower cost. Notable among these designs is a rotary plug valve illustrated in U.S. Pat. No. 3,623,696, which employs an eccentric rotary plug that swings into an orifice for tight shut-off in one of its end positions. However, such tight shut-off is only possible, if the spherical plug surface perfectly matches the circular seating surface of the valve orifice. Machining tolerances and other distortions make such a perfect match practically impossible. It is therefore the objective of U.S. Pat. No. 3,623,696 to provide flexibility between the guiding hub of the eccentric plug and the spherical head portion of the plug, in order to permit such desired alignment. While this approach works reasonably well, it demands fairly thin and fragile arms supporting the plug which are easily distorted or, with more brittle hardenable steels, easily fractured, degrading the reliability of the device.

Another attempt to simplify valve construction and to reduce cost is illustrated in U.S. Pat. No. 3,724,813, showing a valve consisting of a tubular globe housing having sliding insert means containing a valve orifice. While a notable progress in the art, the invention is still designed around conventional reciprocating plug style gobe valves with their inherent limitations in rangeability (which is low due to the required mechanical clearance between plug outside diameter and inside diameter of the controlling surface of the seatring) and the high actuator force requirement posed by the single-seated. unbalanced plug form, offering no mechanical advantages. The machined length of the sliding insert is of critical importance, since the downstream gasket has to seal against the full inlet pressure of the fluid passing the gap between insert and housing bore.

BRIEF SUMMARY OF THE INVENTION

My invention overcomes these and other disadvantages in that it provides for an eccentric rotary plug valve, whose working parts are slidably inserted into a tubular housing for easy assembly and accessability.

Contrary to prior art, sealing between the spherical plug and seatring is greatly simplified in that the controlling distance between plug and seatring is a function of a simple to measure and to machine distance within a removable yoke, forming the shell of a sliding insert assembly rather than the accumulated number of dimensions inherent in a cast housing design of prior art.

Furthermore, an eccentric relationship between the outer guide diameter of the seatring and the seating surface of the seatring bore, mating with the valve plug, permits simple adjustment for alignment of the former with the latter without resorting to the use of thin arms, deformable in the highly stressed direction of rotation.

Another advantage of my invention is the fact, that the rotating plug can be directly connected to a reciprocating actuator stem, eliminating expensive and back-lash producing external rotary shaft connections and seals.

Yet, another advantage of my invention is the ability to operate against fairly high pressure acting on the valve plug without requiring high actuator forces, due to the built-in mechanical advantage given by the ratio between plug eccentricity and the distance between plug shaft center and the effective arc through which the actuator stem connection travels.

My invention assures a high ratio of controllable flow area between zero stroke and fully open. Contrary to reciprocating plug valves, there is no minimum uncontrollable flow area due to mechanical clearance between plug and seatring. Therefore, effective control starts immediately after the plug loses contact with the seatring surface.

In addition, my invention permits the use of conventional reciprocating actuators of standard and well-known construction, despite the fact that the inner valve mechanism is rotary in nature.

Finally, my invention employs a sliding insert assembly, which is firmly pressed against a shoulder of the tubular housing near the inlet side and thereby eliminating deformation caused by pipeline stresses acting on inserts of prior art and in particular on the critical distance between plug axis and seating surface, while at the same time allowing unrestrained thermal expansion of the insert.

These and other advantages of my invention will become apparent from a study of the following detailed description and drawings.

BRIEF DESCRIPTION OF DRAWINGS

FIG. 3 is a transverse section of the invention taken on lines 3 — 3 of FIG. 1.

DETAILED DESCRIPTION OF THE INVENTION

Figure 1:
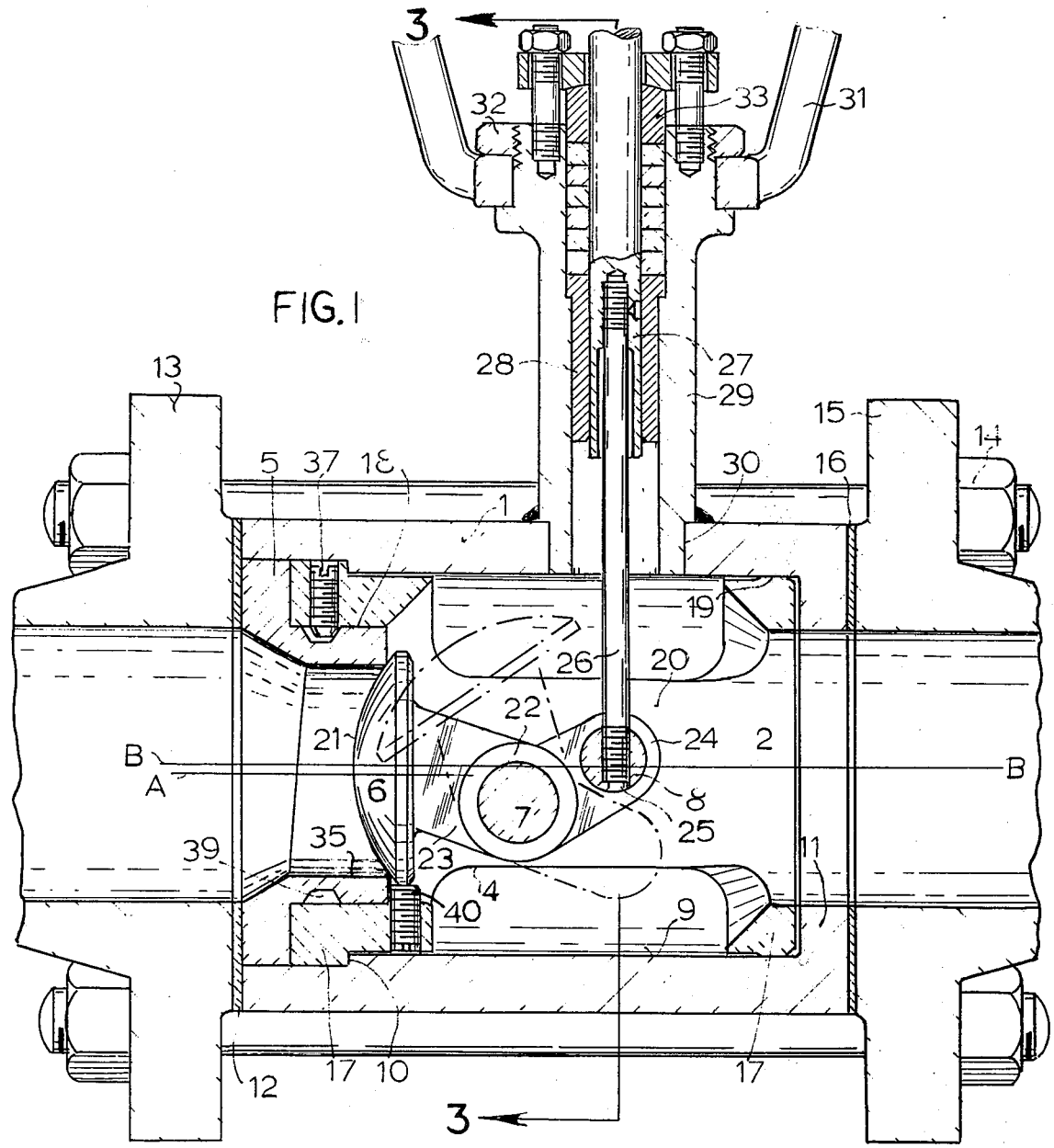
FIG. 1 is a vertical sectional view of a preferred embodiment of my invention.

The invention eccentric rotary plug valve with quick removal trim insert consists in part of a tubular housing 1 made in the preferred embodiment, shown in FIG. 1, from steel bar stock. An insert assembly 2 consisting of a yoke 4, a seatring 5, an eccentric rotating plug 6, a shaft 7, and a pin 8 is slidingly engaged within a central bore 9 of said housing 1 against a stop shoulder 10. The complete insert assembly 2 is firmly held in place and compressed against stop shoulder 10 by the load exerted by a line gasket 12 compressed between a line flange 13 and partly between the end facing of housing 1 and the flange type shoulder of seatring 5. A set of tie-rods and nuts 14 connects said line flange with another flange 15 and clamps the complete valve assembly between them in a vise-like manner. A second gasket 16 seals the opposite end of housing 1 having a shoulder 11, which terminates bore 9.

Yoke 4 consists of two rings 17 guiding the seatring 5 within bore 18 on one side and centered with an exterior facing 19 within housing 1. Two ribs 20 connect said rings 17 in a rigid manner and support the eccentric plug 6 by means of a shaft 7 straddling said two ribs 20 within holes located perpendicularly and vertically off-set towards valve centerline B — B along an axis D — D, shown in FIG. 2.

Valve plug 6 has a spherical head portion 21, which in the closed-position engages with seatring 5 and which connects to a hub 22 tiltingly supported on shaft 7 by a rib 23. Another pair of ribs 24 terminates away from hub 22 and supports a pin 8 having a central cross bore 25 which is threaded to engage a reciprocating valve stem 26 of which the upper thickened portion 27 guides within a guide bushing 28. The latter is pressed into the bore of a forged or fabricated bonnet 29 which is brazed or welded to housing 1 at an intersection 30 and which carries actuator means 31 of well established and conventional art (not fully shown) suitably fastened by a drive nut 32. Stem portion 27 is sealed by a suitable packing box arrangement 33 and in turn connects to the movable portion of said actuator means 31.

Following a command signal from a controlling instrument, actuator 31 will position stem 27 downwards and thereby tilt plug 6 around shaft 7, which in turn causes the spherical head portion 21 to disengage from seatring 5 and allow fluid flow to commence. Termination of the stroke and full flow is reached after plug 6 has been rotated about 55° assuming a final position, indicated by dotted lines in FIG. 1. It should be understood that valve plug 6 may assume any intermediate position dictated by said controlling instrument and therefore precisely control an even so slight demand in flow variation without the detriments of backlash or loose play inherent in the actuating means of conventional rotary valves. This is accomplished by having stem 27 threadingly engaged with plug 6 and whereby stem 27 is either purposely thinned-down to a slender lower portion 26 or containing a separate thinner threaded extension 26 (as shown) made of a higher tensile strength and hardenable stainless steel, in order to bend slightly to follow the change in effective lever length of ribs 24, while any angular misalignment is avoided through the rotation of pin 8 following an angular excursion of plug 6.

Most control valve applications demand tight shut-off in the "zero flow" position. The present invention accomplishes this by firm engagement of the spherical head portion with the intersecting corner 34 (see FIG. 2) of seatring bore 35. However, such flawless seating is only possible, if an exact distance (indicated as L in FIG. 2) exists between the center of the plug sphere and the intersecting corner 34. Such precise machining is not practical nor possible. To overcome this problem of alignment, my invention allows adjustment during assembly, as explained in more detail.

While the outer diameters of seatring 5 originate from valve centerline B, there purposely is an off-set between centerline B and the centerline A of seatring bore 35.

Figure 2:
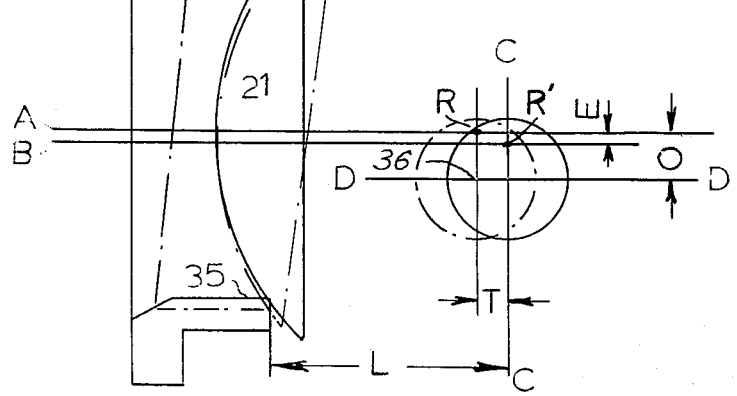
FIG. 2 is an enlarged diagram in which the possible alignment positions between plug and seatring are shown exaggerated for illustration.

Referring now to FIG. 2, perfect alignment between plug 6 and seatring bore 35 can exist only, if the center R of the spherical plug portion 21 coincides with the centerline of seatring bore 35 and if distance L is correct (shown by solid lines of sphere 21 and shaft 7). Assuming, the bore for shaft 7 in yoke 4 is mislocated by a tolerance T, then plug 6 has to be tilted to the right around center 36, in order to correct for this erroneous distance and to relocate the spherical center (now designated as R') back onto the correct axis C — C.

However, while swinging plug 6 around center 36 towards dotted position, spherical center R' is moved downwards towards centerline D — D by a distance E. This, in turn, can be corrected by moving the centerline of seatring bore 35 downwards to match the new plug center location. Such an adjustment of the seatring bore 35 (as indicated by dotted lines) is accomplished by simple rotation of the seatring 5 within bore 18 and utilizing its inherent eccentricity. A final, selected location (matching that of the spherical plug head) is then secured by one or more setscrews 37 whose tapered ends engage the tapered side wall of a groove 39 cut into seatring 5. Any sideways rotation of said seatring bore center can easily be followed by plug 6 through lateral displacement along the axis of shaft 7, since sufficient clearance 38 is provided between hub 22 and ribs 20. An adjustable setscrew 40 may be used to avoid excessive loading pressure between plug 6 and seatring surface 34 by limiting the downward rotation of plug 6 after correct seating is achieved.

The amount of eccentricity or off-set E required between the outer guiding diameter of seatring 5 and its inner bore 35 can be calculated as follows:

$$E = 0 - \sqrt{0^2 - T^2}$$

(plus the maximum tolerance in dimension 0).

The preferred embodiment of my invention has been described in a form, where the rotating eccentric plug 6 is moved by a reciprocating valve stem 27, presenting a more economical and convenient solution. Nevertheless, it should be understood that a similar purpose can be achieved without departing from the spirit of my invention and the scope of the attached claims by extending shaft 7 through the wall of housing 1 and connecting it directly to rotary actuating means after having shaft 7 suitably keyed to hub 22.

I claim:

1. Eccentric rotary plug valve with quick removal trim insert comprising:
   a. a tubular housing;
   b. one inlet and outlet end formed in said housing, said inlet and outlet ends adapted to be coupled to a pipeline;
   c. a straight cylindrical passage formed in said housing and extending from one end of said housing towards a shoulder near the other end of said housing providing at that point a reduced cross-section, said passage additionally having a slightly enlarged diameter portion near the inlet side;
   d. a cylindrical insert assembly removably placed within the straight cylindrical passage having a raised diameter portion slidingly engaging the slightly enlarged diameter near the inlet side of said housing and engaging a stop shoulder formed at the terminating end of said enlarged portion of said passage, leaving the remaining length of said insert assembly unrestrained within said straight cylindrical passage of the housing;
   e. a bore or passage extending throughout the central length of a yoke forming the retaining shell of said insert assembly;
   f. a seatring guiding closely within one end of the bore of said yoke or housing and having a flanged portion engaging one terminating end of said yoke within the slightly enlarged portion of said straight cylindrical housing passage;

g. a shaft located perpendicular to and off-set from the longitudenal axis of said yoke and being retained on either end by the outer walls of said yoke;

h. an eccentrically rotating plug tiltingly engaged on said shaft and within the central bore or passage of said yoke by a hub, said plug having a fully or partly spherical head portion suitably connected to the hub, said head portion engaging and cooperating with a bore of said seatring, and wherein the center of said sphere is located essentially along the central axis of said seatring bore;

j. means to tiltingly move said valve plug;

k. actuating means connected exterior of said housing and cooperating with said means to tiltingly move the valve plug.

2. A valve of claim 1, wherein said seatring has its bore on an axis that is off-set from the center of the exterior diameter guidingly engaged within said yoke and where the seatring may be rotated to permit alignment with the center of said spherical plug head.

3. A valve of claim 1, wherein said tilting means for moving the valve plug consists of a pair of ribs extending from the hub of said plug containing between themselves a rotatable pin threadingly engaging a reciprocating valve stem.

4. A valve of claim 3, wherein said reciprocating valve stem has a flexible reduced diameter portion extending to and connecting with said pin from a larger diameter stem portion slidingly engaged in a bonnet fastened to said tubular housing.

5. A valve of claim 1, wherein said yoke consists of two opposed cylindrical wall portions connected by two parallel ribs containing said shaft in an off-set fashion.

* * * * *